(12) United States Patent
Takeuchi et al.

(10) Patent No.: US 9,006,572 B2
(45) Date of Patent: Apr. 14, 2015

(54) ELECTRIC WIRE FIXTURE DEVICE

(75) Inventors: Kunihiko Takeuchi, Shizuoka (JP); Kenta Kamiya, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 35 days.

(21) Appl. No.: 13/883,236

(22) PCT Filed: Nov. 21, 2011

(86) PCT No.: PCT/JP2011/077291
§ 371 (c)(1),
(2), (4) Date: May 2, 2013

(87) PCT Pub. No.: WO2012/070674
PCT Pub. Date: May 31, 2012

(65) Prior Publication Data
US 2013/0220697 A1    Aug. 29, 2013

(30) Foreign Application Priority Data

Nov. 22, 2010    (JP) .................................. 2010-259962

(51) Int. Cl.
*H02G 3/04*    (2006.01)
*B60R 16/02*    (2006.01)
*H02G 3/32*    (2006.01)

(52) U.S. Cl.
CPC .............. *H02G 3/04* (2013.01); *B60R 16/0215* (2013.01); *H02G 3/32* (2013.01)

(58) Field of Classification Search
USPC ................. 174/72 A, 68.1; 439/207
See application file for complete search history.

(56) References Cited

U.S. PATENT DOCUMENTS

| 2010/0162646 | A1 | 7/2010 | Grice |
| 2013/0228367 | A1* | 9/2013 | Sato et al. ..................... 174/480 |

FOREIGN PATENT DOCUMENTS

| JP | 8-168134 A | 6/1996 |
| JP | 2001-208281 A | 8/2001 |
| JP | 2005-80429 A | 3/2005 |
| JP | 2007-166805 A | 6/2007 |
| JP | 2007-174821 A | 7/2007 |
| JP | 2009-65798 A | 3/2009 |
| JP | 2009-77517 A | 4/2009 |

OTHER PUBLICATIONS

International Search Report for PCT/JP2011/077291 dated Feb. 17, 2012.
Japanese Office Action for the related Japanese Patent Application No. 2010-259962 dated Aug. 5, 2014.

* cited by examiner

*Primary Examiner* — Dhirubhai R Patel
(74) *Attorney, Agent, or Firm* — Kenealy Vaidya LLP

(57) ABSTRACT

The electric wire fixture device is provided with a bottom wall on which the electric wire is placed, and a side wall upstanding from the bottom wall. The side wall is provided with an aperture passed through by a fixing member for fixing the electric wire. The fixing member fixes the electric wire so that the fixing member passes through the aperture after being wound around the electric wire and that the electric wire is then brought close to the side wall. The side wall is provided with a pair of ribs projecting toward the electric wire from the side wall. The pair of the ribs is disposed spaced along a longitudinal direction of the electric wire, and the pair of ribs is disposed to position the aperture therebetween.

4 Claims, 9 Drawing Sheets

ELECTRIC WIRE FIXTURE DEVICE

This application is a U.S. national phase filing under 35 U.S.C. §371 of PCT Application No. PCT/JP2011/077291, filed Nov. 21, 2011, and which in turn claims priority under 35 U.S.C. §119 to Japanese Patent Application No. JP2010-259962, filed Nov. 22, 2010, the entireties of which are incorporated by reference herein.

TECHNICAL FIELD

This invention relates to an electric fixture device to be employed for, e.g., guiding electric wires in an engine compartment in an automobile.

BACKGROUND ART

FIG. 14 is a perspective view illustrating partial cross-sectional surface of a conventional electric wire fixture device. The conventional electric wire fixture device 101 shown in the FIG. 14 is provided with a bottom wall 107 on which the electric wire 12 is placed, and a pair of side walls 110A, 110B upstanding from the bottom wall 107, positioning the electric wire therebetween, and is formed in a gutter shape.

The side wall 110A is provided with an aperture 111 through which a fixing member 13 passes as a fixture for fixing the electric wire 12.

In the electric wire 101 mentioned above, while the electric wire 12 is placed on the bottom wall portion 107, a tip portion of a banding band 8 is passed through the aperture 111 before the banding band 13 is wound around the electric wire 12, and the electric wire is then brought close to the side wall to be fixed (see PTL 1, PTL 2, and PTL 3).

PRIOR ART DOCUMENT

Patent Literature

PTL 1: Japanese Patent Application Laid-Open Publication No. 2005-80,429
PTL 2: Japanese Patent Application Laid-Open Publication No. 2009-65,798
PTL 3: Japanese Patent Application Laid-Open Publication No. 2001-208,281

DISCLOSURE OF THE INVENTION

Problem to be Solved by the Invention

However, there is a drawback to be mentioned below in the above-mentioned conventional electric wire fixture device 101. Namely, with the conventional electric wire fixture device 101, the electric wire 12 fixed to the electric wire fixture device 101 may be displaced in a longitudinal direction of the electric wire 12.

Accordingly, an object of the present invention, in light of the drawback above, is to provide an electric wire fixture device fixing electric wire without displacement.

Means for Solving the Problem

The invention described in claim 1, there is provided an electric wire fixture device comprising a bottom wall on which an electric wire is placed, and a side wall upstanding from the bottom wall, provided with an aperture through which a fixing member for fixing the electric wire passes, the fixing member being adapted to be wound around the electric wire after being passed through the aperture, and bring the electric wire close to the side wall and secure the electric wire thereto, wherein the side wall is provided with a pair of ribs projecting toward the electric wire from the side wall, the pair of the ribs being disposed spaced along a longitudinal direction of the electric wire and positioning the aperture therebetween.

The electric wire fixture device recited in claim 1, comprises a pair of second ribs projecting toward the electric wire from the bottom wall and passing the fixing member therethrough, the electric fixture device being characterized by the fact that the pair of second ribs is connected to the pair of ribs, respectively, and is disposed along a approaching direction of the fixing member.

The electric wire fixture device recited in claim 2, is characterized by the fact that the pair of ribs is provided with a level curved surface formed convex in a direction separating from the side wall as approaching the bottom wall.

Effects of the Invention

According to the invention described in claim 1, since the electric wire fixture device comprising a bottom wall on which an electric wire is placed, and a side wall upstanding from the bottom wall, provided with an aperture through which a fixing member for fixing the electric wire passes, the fixing member being adapted to be wound around the electric wire after being passed through the aperture, and bring the electric wire close to the side wall and secure the electric wire thereto, wherein the side wall is provided with a pair of ribs projecting toward the electric wire from the side wall, the pair of the ribs being disposed spaced along a longitudinal direction of the electric wire and positioning the aperture therebetween, it is made possible that the electric wire brought close to the side wall by the fixing member is pushed against between the pair of ribs, therefore providing the electric wire fixture device that can fix the electric wire without displacement in a longitudinal direction thereof.

According to the invention described in claim 2, since the electric wire fixture device recited in claim 1 comprises a pair of second ribs projecting toward the electric wire from the bottom wall and passing the fixing member therethrough, the pair of second ribs being connected to the pair of ribs, respectively, and disposed along a approaching direction of the fixing member, it is made possible that the pair of second ribs guides a tip of the fixing member passed through the aperture along an approaching direction of the fixing member, thus improving assembling workability.

According to the invention described in claim 3, since the pair of ribs is provided with a level curved surface formed convex in a direction separating from the side wall as approaching the bottom wall, it is made possible to prevent scar by the ribs.

DESCRIPTION OF EMBODIMENTS

Figure 1:
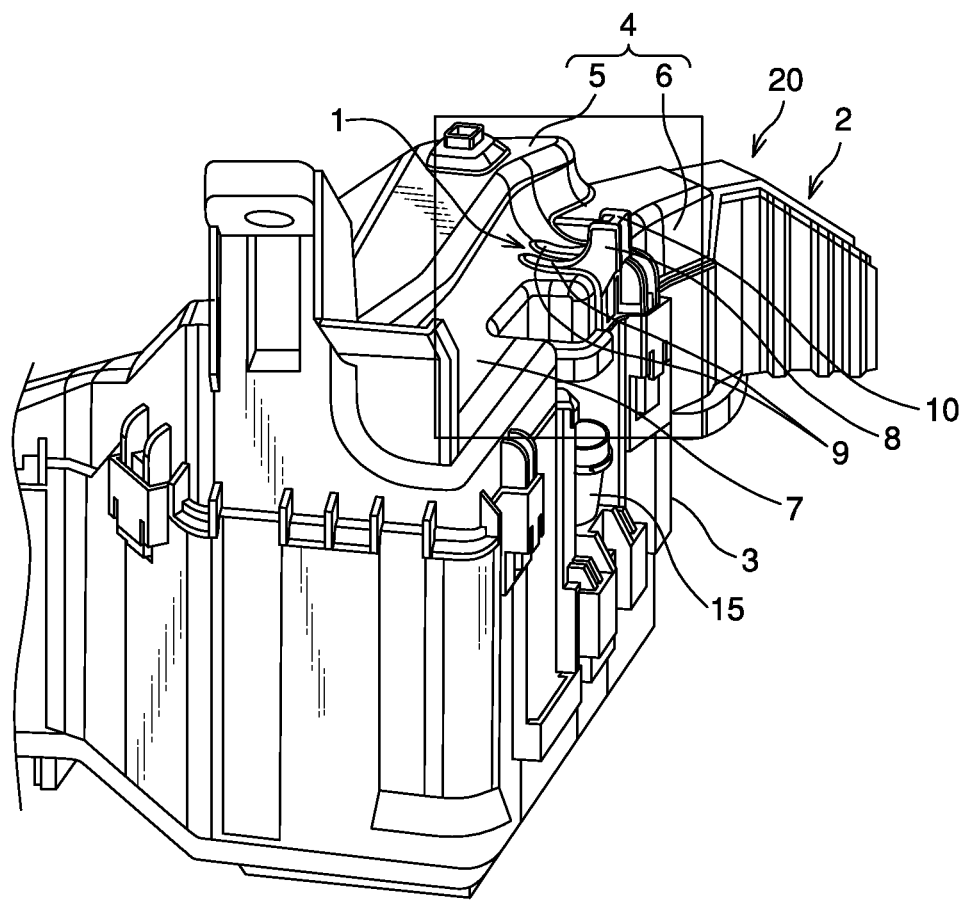
FIG. 1 is a perspective view illustrating one embodiment of an electric junction box in which an electric wire fixture device is incorporated according to the present invention.

Hereafter, an electric wire fixture device 1 according to one embodiment of the present invention will be described with reference to FIGS. 1 to 13. The electric wire fixture device 1, e.g., shown in FIG. 1, is attached to an engine compartment of an automobile, which supplies various electric parts mounted on the automobile with power. Hereinafter, a junction box, a fuse block, and a relay box are herein referred to as an electric junction box.

Figure 2:
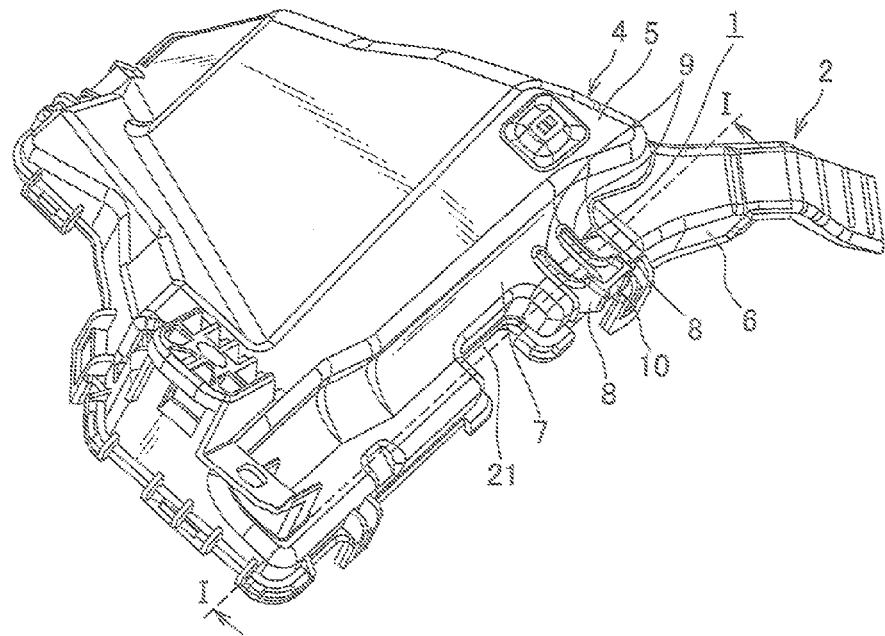
FIG. 2 is a perspective view illustrating the electric junction box shown in FIG. 1 seen from different angle.

The electric junction box 20 is, as shown in FIGS. 1 and 2, provided with a box main body 2 formed in a box shape, and a side cover 15 attached to the box main body. In FIG. 2 (or FIG. 7) the side cover 15 is abbreviated.

The box main body 2 is formed in a frame shape, and provided with a main body 3 in which electric parts are mounted, an upper cover (not shown) detachably attached to the main body 3 so as to cover one opening of the main body 3, and lower cover 4 detachably attached to the main body 3 so as to cover the other opening away from the one opening of the main body 3.

Further, the main body 2 is provided with a concave groove 21 for pulling in the other end of the electric wire 12 one of which is connected with a battery inside the main body 2. The concave groove 21 is concavely formed from an outside face of the box main body 2, and straightly extends along an approaching direction from the one opening toward the other opening. The concave groove 21 is disposed between the main body 3 and the lower cover 4, inside which the side cover 15 is adapted to be attached.

Figure 3:
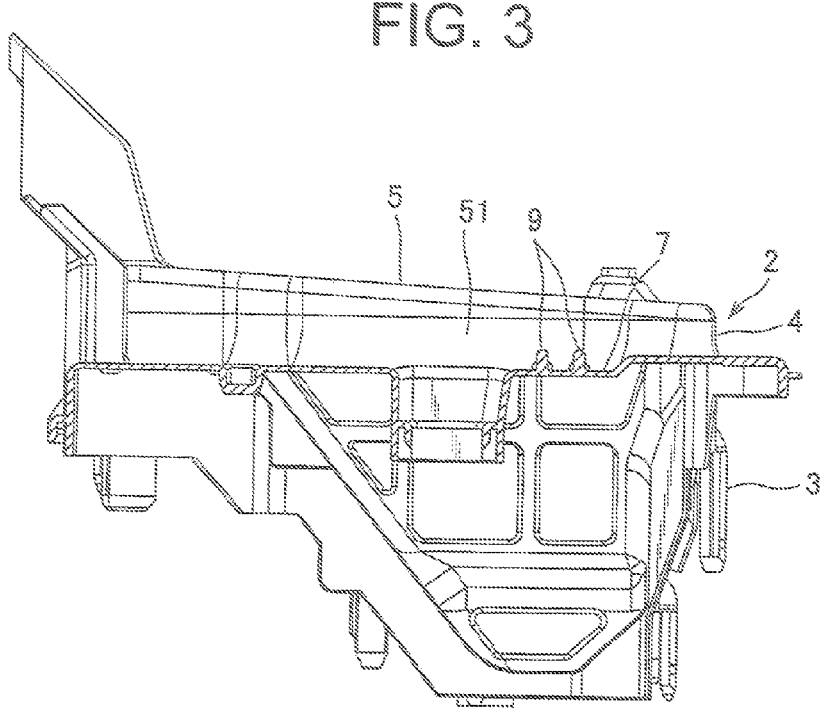
FIG. 3 is a cross-sectional view along I-I line shown in FIG. 2.
Figure 4:
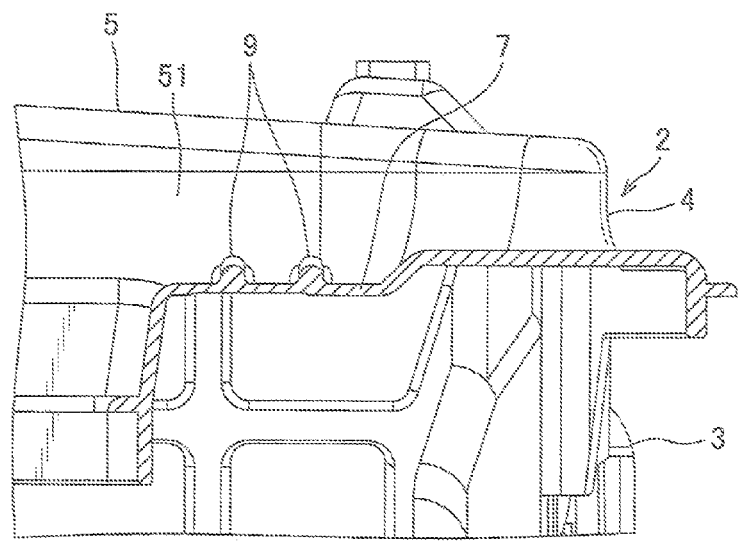
FIG. 4 is an enlarged view illustrating the electric wire fixture device shown in FIG. 3.
Figure 5:
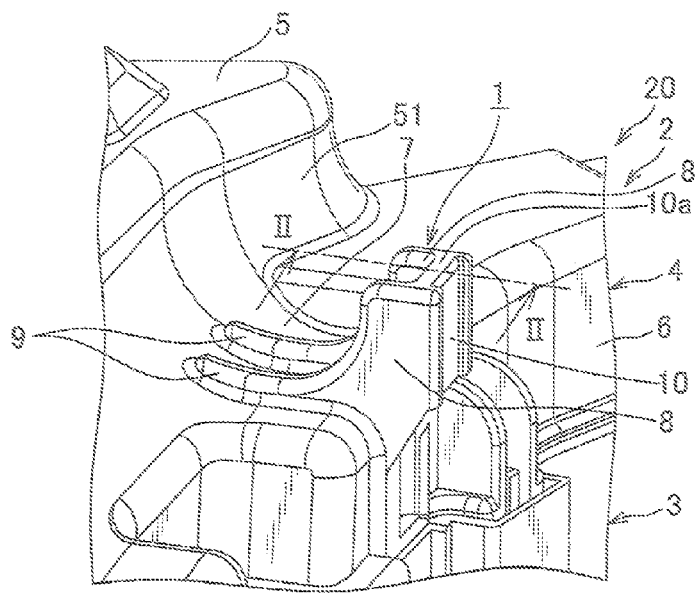
FIG. 5 is an enlarged view illustrating the electric wire fixture device shown in FIG. 1.

The lower cover 4, as shown in FIGS. 3, 4 and 5, is made of insolating synthetic resin, and is formed in a tubelar shape with a bottom by injection mold. The lower cover 4 is provided with a base wall 5, a side wall 6 upstanding from a side edge of the base wall 5, and the electric wire fixture device 1.

The electric wire fixture device 1 is formed in an L-shape by a bottom wall 7 disposed between the base wall 5 and the side wall 6 and positioned on a bottom of an L-shaped recess that is formed outside the base wall 5, and a side wall 10 upstanding from the bottom wall 7, opposite to a side 51 of the L-shaped recess that is formed outside the base wall 5.

On the bottom wall 7 is placed the other end of the electric wire 12 one of which is connected to the battery as a power supply.

Figure 6:
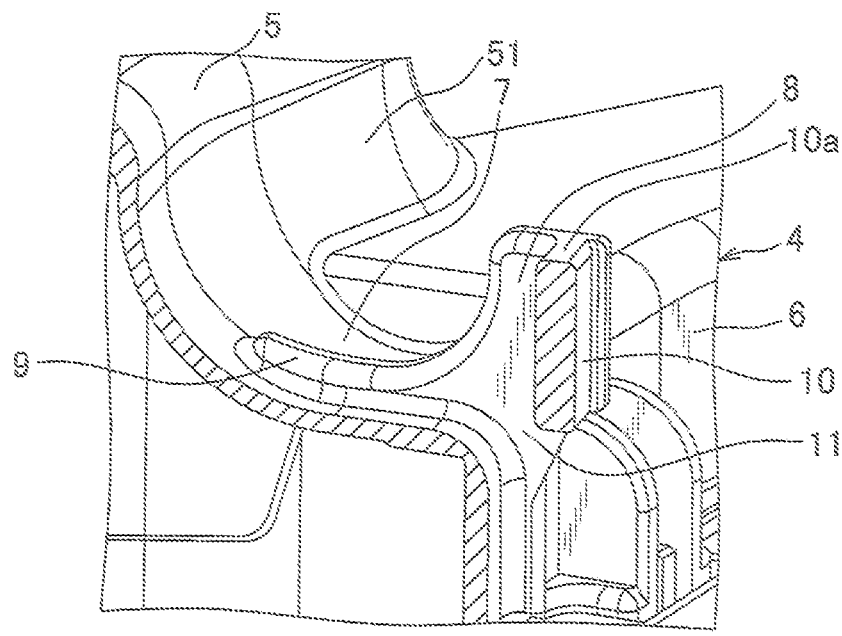
FIG. 6 is a cross-sectional view along II-II line shown in FIG. 5.

The side wall 10 is, as shown in FIG. 6, provided with an aperture 11 a banding band is passed through as a fixing member for fixing the electric wire 12, and a pair of first ribs 8 projecting toward the electric wire 12 from the side wall 10.

Figure 7:
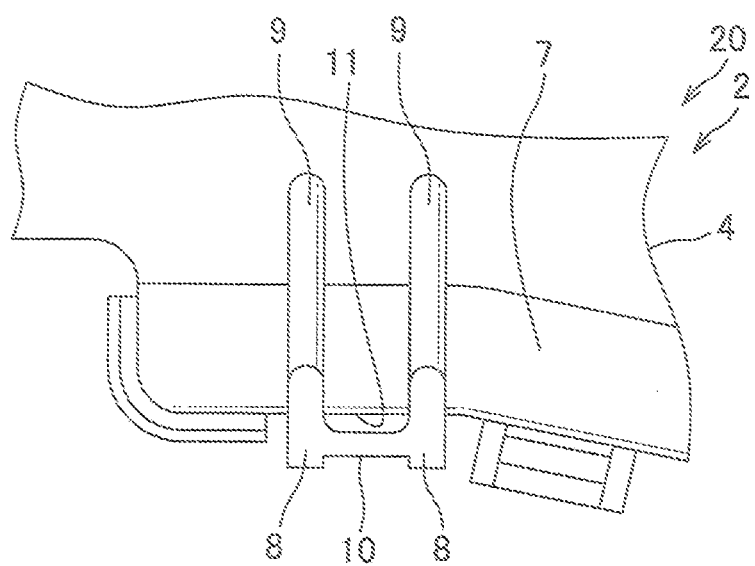
FIG. 7 is a top view illustrating the electric wire fixture device shown in FIG. 5.

The aperture 11, as shown in FIG. 7, passes through the side wall 10. The aperture 11 is also disposed on an end of the side wall 10 at the bottom wall 7 side. The aperture 11 is an aperture formed for pulling out the mold when producing the lower cover 4 by injection molding.

A pair of first ribs 8 is disposed spaced along a longitudinal direction of the electric wire 12. The pair of the first ribs 8 is disposed to position the aperture 11 therebetween, one of which connects to both ends of the aperture 11, the other of which extends toward the direction away from the bottom wall 7. The pair of the first ribs 8 connects to a pair of second ribs 9 to be mentioned below, respectively, on which a level curved surface is formed convex in a direction away from the side wall 11 as approaching the bottom wall 7 (the second ribs 9).

Furthermore, the electric wire fixture device 1 is provided with a pair of second ribs 9. The pair of second ribs projects toward the electric wire 12 from the bottom wall 7. The pair of second ribs 9 is disposed spaced along a longitudinal direction of the electric wire 12, between which the banding band 13 passed through the aperture 11 is passed through. The pair of second ribs 9 is disposed along an approaching direction of the banding band 13, one end of which connects to each of the pair of the first ribs, the other end of which extends toward a separating direction of the side wall 10.

The side cover 15 is tubelarly formed. Inside the side cover 15 the other end of the electric wire 12 one end of which is connected with the battery is passed through. The electric wire 12 passed through inside the side cover 15 is thus pulled in inside the box main body 12 so as to being connected with various electric parts mounted inside the box main body 2 (main body 3).

Figure 8:
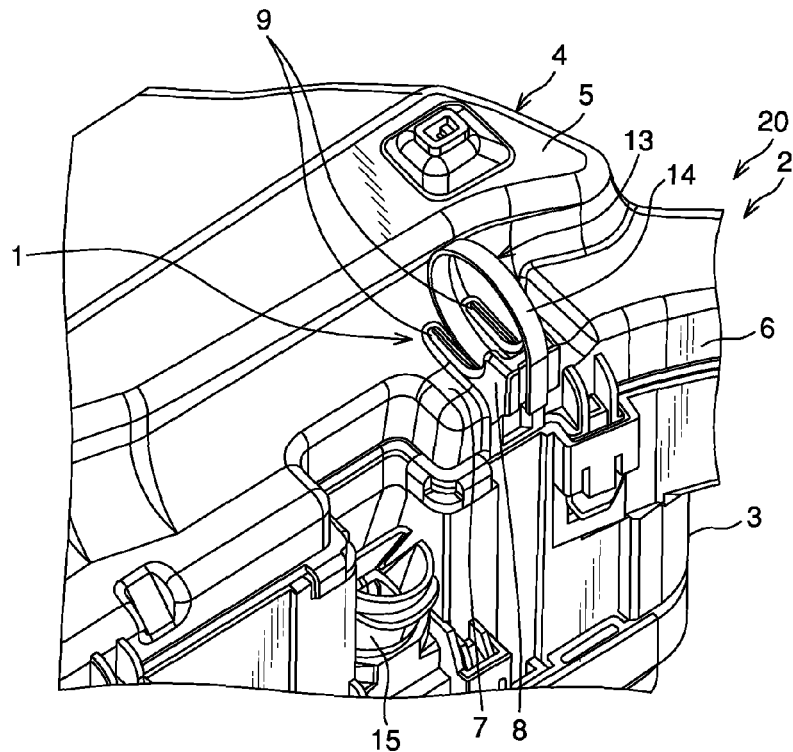
FIG. 8 is a perspective view illustrating a state that a banding band is passed through the electric wire fixture device shown in FIG. 5.
Figure 9:
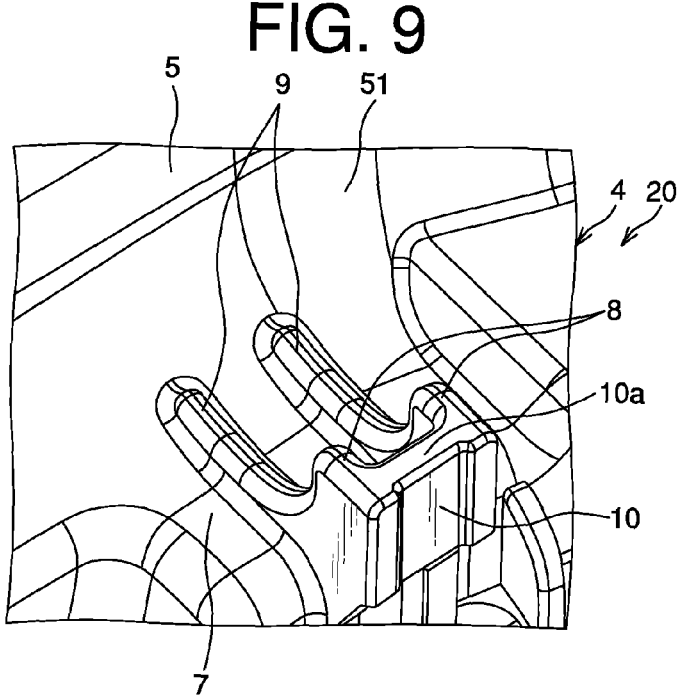
FIG. 9 is a perspective view illustrating the electric wire fixture device shown in FIG. 5 seen from different angle.

The above banding band 13 as a fixing member is provided with, as shown in FIG. 8, a banding part (not shown), and band body 14. The banding part is tubelarly formed, which has through inlet arranged in the middle. The band main body 14 is formed in a strip shape. One end of the band main body 14 is integrally connected to the banding part. The other end of the band main body 14 (a tip) is passed through the through inlet, and the tip side of the band main body 14 is locked in the banding part.

Hereafter will be explained a procedure for assembling the electric junction box 20 provided with the above-mentioned electric wire fixture device 1. First, inside the main body 3 electric parts has preliminarily been mounted. Further, the lower cover 4 has been attached so as to cover the other opening of the main body 3 electric parts are mounted.

Figure 10:
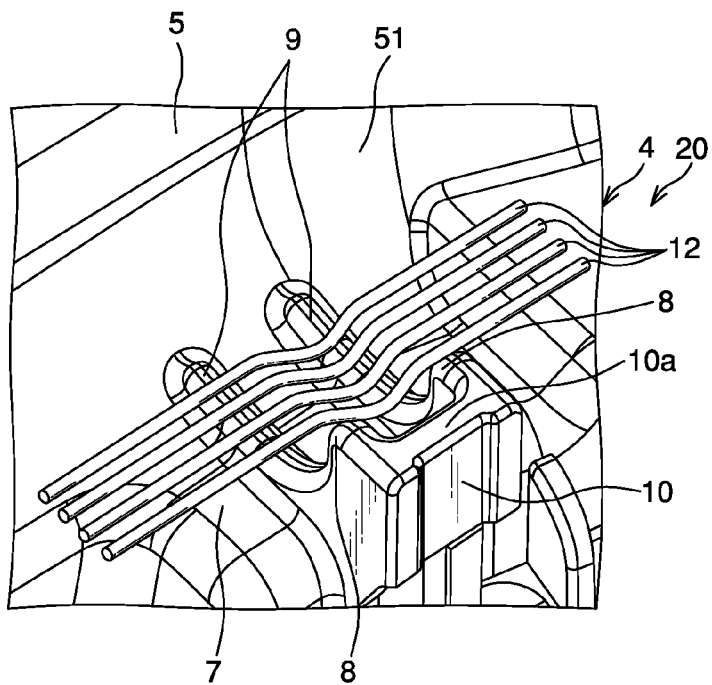
FIG. 10 is a perspective view illustrating a state that an electric wire is placed on the electric wire fixture device shown in FIG. 9.
Figure 11:
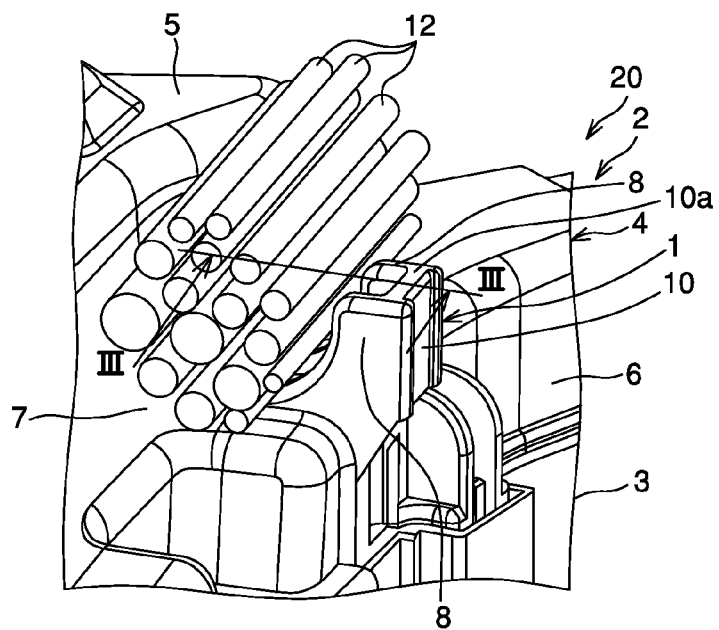
FIG. 11 is a perspective view illustrating the electric wire fixture device in a state that the electric wire is placed on the electric wire fixture device shown in FIG. 8 seen from different angle.
Figure 12:
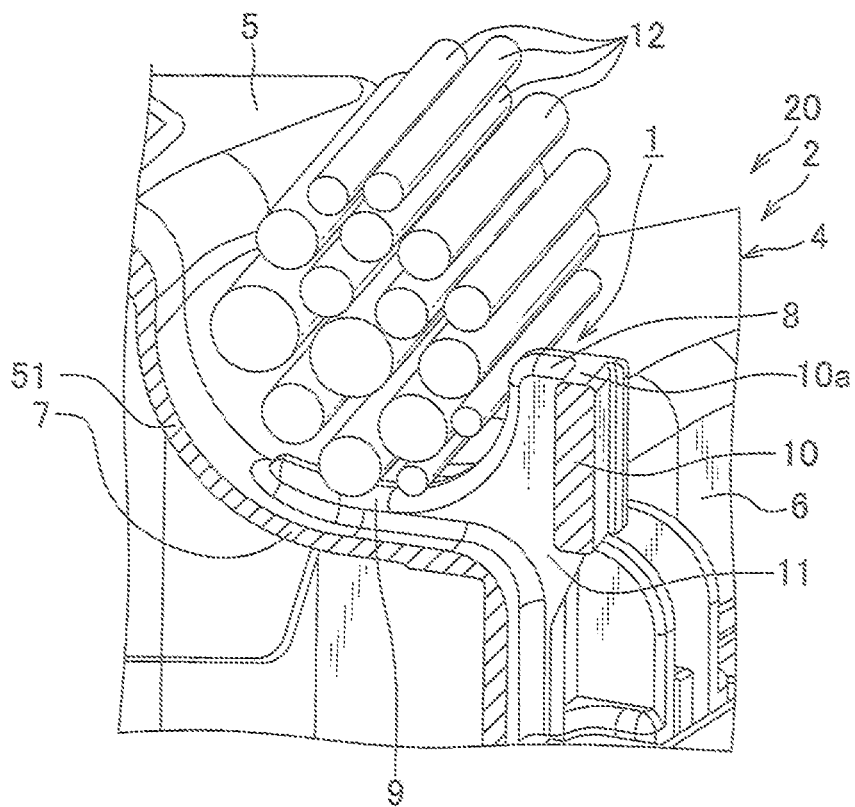
FIG. 12 is a cross-sectional view along line shown in FIG. 11.
Figure 13:
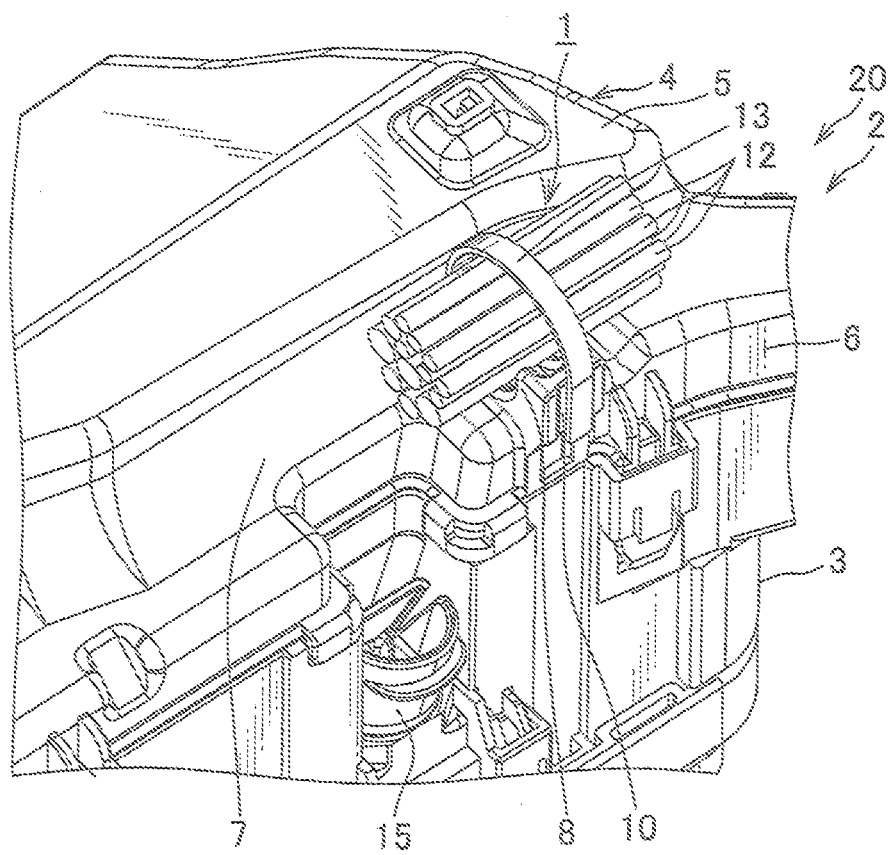
FIG. 13 is a perspective view illustrating a state that the electric wire is secured to a side wall with the electric wire being placed on a bottom wall shown in FIG. 11.
Figure 14:
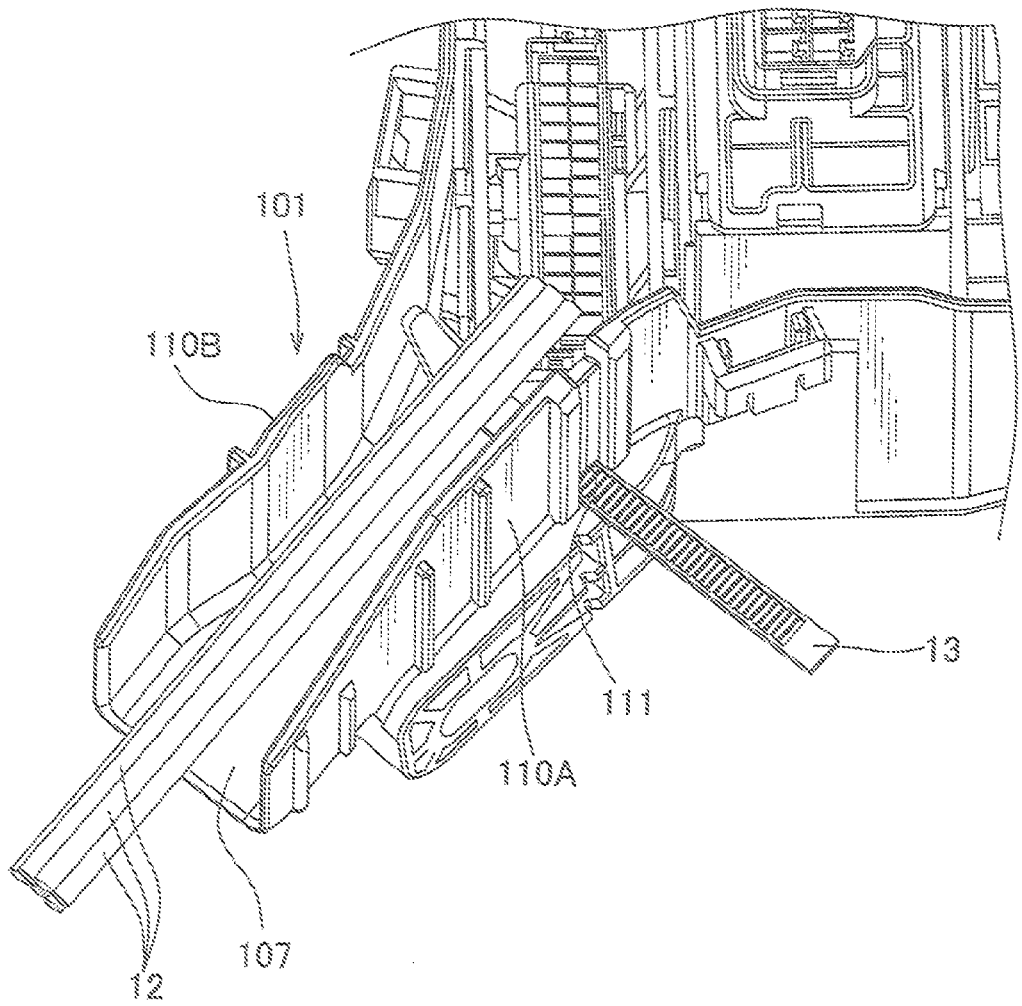
FIG. 14 is a perspective illustrating a conventional electric wire fixture device.

Then, as shown in FIGS. 10, 11 and 12, the other end of the electric wire 12 the one end of which is connected with the battery as a power supply, is placed on the bottom wall 7 of the electric wire fixture device 1. Further, the tip of the banding band 13 is passed through the aperture 11 while the electric wire is placed on the bottom wall 7. Thereby, the tip approaches between the pair of the second ribs as well as between the electric wire 12 and the bottom wall 7. Approaching further, the tip is wound around the outside the electric wire 12, and stacked on the upper face 10a of the side wall 10 away from the bottom wall 7 before the tip is passed through the through inlet of the banding part, the other end of the band main body 14 is locked in the banding part. The electric wire is, as shown in FIG. 13, thus secured to the electric wire fixture device 1.

Next, the other end of the electric wire 12 is passed through inside the side cover 15 while the electric wire 12 is secured to the electric wire fixture device 1. Further the side cover 15 the electric wire 12 has been passed through is attached to the concave groove 21 before the other end of the electric wire 12 is pulled in inside the box main body 2 so as to being connected with the electric parts mounted inside the box main body 2 (main body 3). Lastly, the upper cover is attached so as to cover the one opening of the main body 3 on which the electric parts are mounted. As a result, the box main body 2 is assembled, and the electric junction box is thus completed.

According to the above-mentioned embodiment, since the electric wire fixture device 1 comprises a bottom wall 7 on which the electric wire 12 is placed, and a side wall 10 upstanding from the bottom wall 7, the side wall 10 being provided with an aperture 11 passed through by a fixing member for fixing the electric wire 12, the fixing member being adapted to be wound around the electric wire 12 after being passed through the aperture 11, and bring the electric wire 12 close to the side wall 10 and secure thereto, the side wall 10 being provided with a pair of ribs projecting toward the electric wire 12 from the side wall 10, the pair of the ribs being disposed spaced along a longitudinal direction of the electric wire 12, and the pair of ribs being disposed positioning the aperture 11 therebetween, it is made possible that the electric wire 12 brought close to the side wall 10 by the banding band 13 as a fixing member is pushed against between the pair of ribs 8, providing therefore the electric wire fixture device 1 that can fix the electric wire 12 without displacement in a longitudinal direction thereof.

Furthermore, since the electric wire fixture device 1 comprises a pair of second ribs 9 projecting toward the electric wire 12 from the bottom wall 7 and passing the banding band 13 therethrough, the pair of second ribs 9 being connected to the pair of ribs 8, respectively, and disposed along a approaching direction of the banding band 13, it is made possible that the pair of second ribs 9 guides a tip of the banding band 13 having been passed through the aperture 11 along an approaching direction of the banding band 13, thus improving assembling workability.

In addition, since the pair of the first ribs 8 is provided with a level curved surface formed convex in a direction separating from the side wall 10 as approaching the bottom wall 7, it is made possible that the electric wire 12 is prevented from being injured by the first ribs 8.

It should be noted that according to the above-mentioned invention, although the electric wire 12 is fixed to the electric fixture device 1, one end of which is connected with the battery and the other end of which is pulled in inside the box main body 2 and is connected with electric parts mounted inside the box main body 2 (main body 3), the present invention is not limited therewithin, the electric wire 12 may be fixed to the electric fixture device 1, one end of which is connected with the battery and the other end of which is not pulled in inside the box main body 2 but is guided within the above-mentioned engine compartment of the automobile, or both the electric wire 12 may be fixed to the electric fixture device 1, one end of which is connected with the battery and the other end of which is pulled in inside the box main body 2 and connected with electric parts mounted inside the box main body 2, and the other electric wire 12 one end of which is connected with the battery and the other end of which is not pulled in inside the box main body 2 but is guided within the above-mentioned engine compartment of the automobile.

It should also be noted that according to the above-mentioned invention, although the electric wire fixture device 1 is disposed in the electric junction box 20, the present invention is in no way limited therewithin, the electric wire fixture device 1 may be employed as, e.g., an protector for guiding the electric wire 7 in the engine compartment.

REFERENCE SIGNS LIST

1 electric wire fixture device
7 bottom wall
8 a pair of first ribs
9 a pair of second ribs
10 side wall
11 aperture
12 electric wire
13 banding band (fixing member)

The invention claimed is:

1. An electric wire fixture device comprising:
a bottom wall on which an electric wire is placed; and
a side wall upstanding from the bottom wall and provided with an aperture through which a fixing member for fixing the electric wire is passed, the fixing member being configured to be wound around the electric wire after a tip of the fixing member is passed through the aperture and stacked on an upper face of the side wall away from the bottom wall in order to bring the electric wire close to the side wall and to secure the electric wire to the side wall;
wherein the side wall is provided with a pair of ribs projecting toward the electric wire from the side wall, the pair of the ribs being disposed spaced along a longitudinal direction of the electric wire and positioning the aperture therebetween.

2. The electric wire fixture device as claimed in claim 1, further comprising a pair of second ribs projecting toward the electric wire from the bottom wall and passing the fixing member therethrough, wherein the pair of second ribs is connected to the pair of ribs, respectively, and extends along an approaching direction of the fixing member.

3. The electric wire fixture device as claimed in claim 2, wherein the pair of ribs is provided with a level curved surface formed convex in a direction separating from the side wall as approaching the bottom wall.

4. The electric wire fixture device as claimed in claim 1, wherein the pair of ribs is provided with a level curved surface formed convex in a direction separating from the side wall as approaching the bottom wall.

* * * * *